Figure 1:
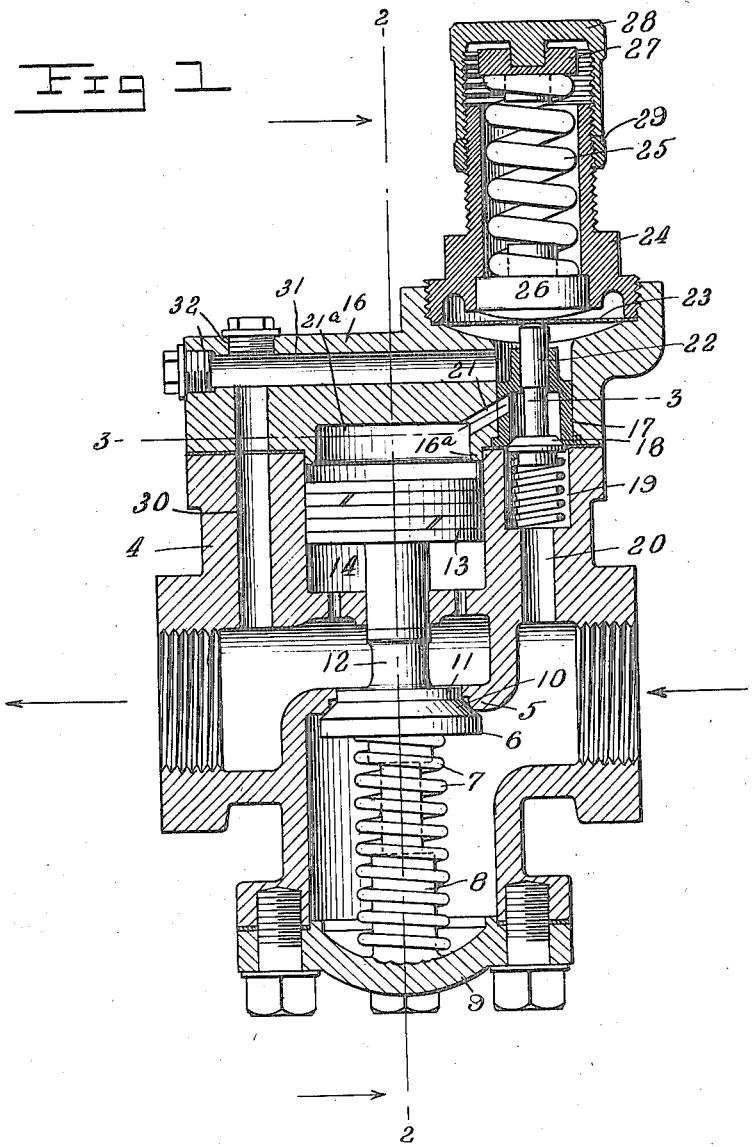

J. W. LYTTON.
PRESSURE REGULATOR.
APPLICATION FILED FEB. 2, 1911.

1,184,761.

Patented May 30, 1916.
2 SHEETS—SHEET 1.

Inventor
Jarard W. Lytton

Witnesses

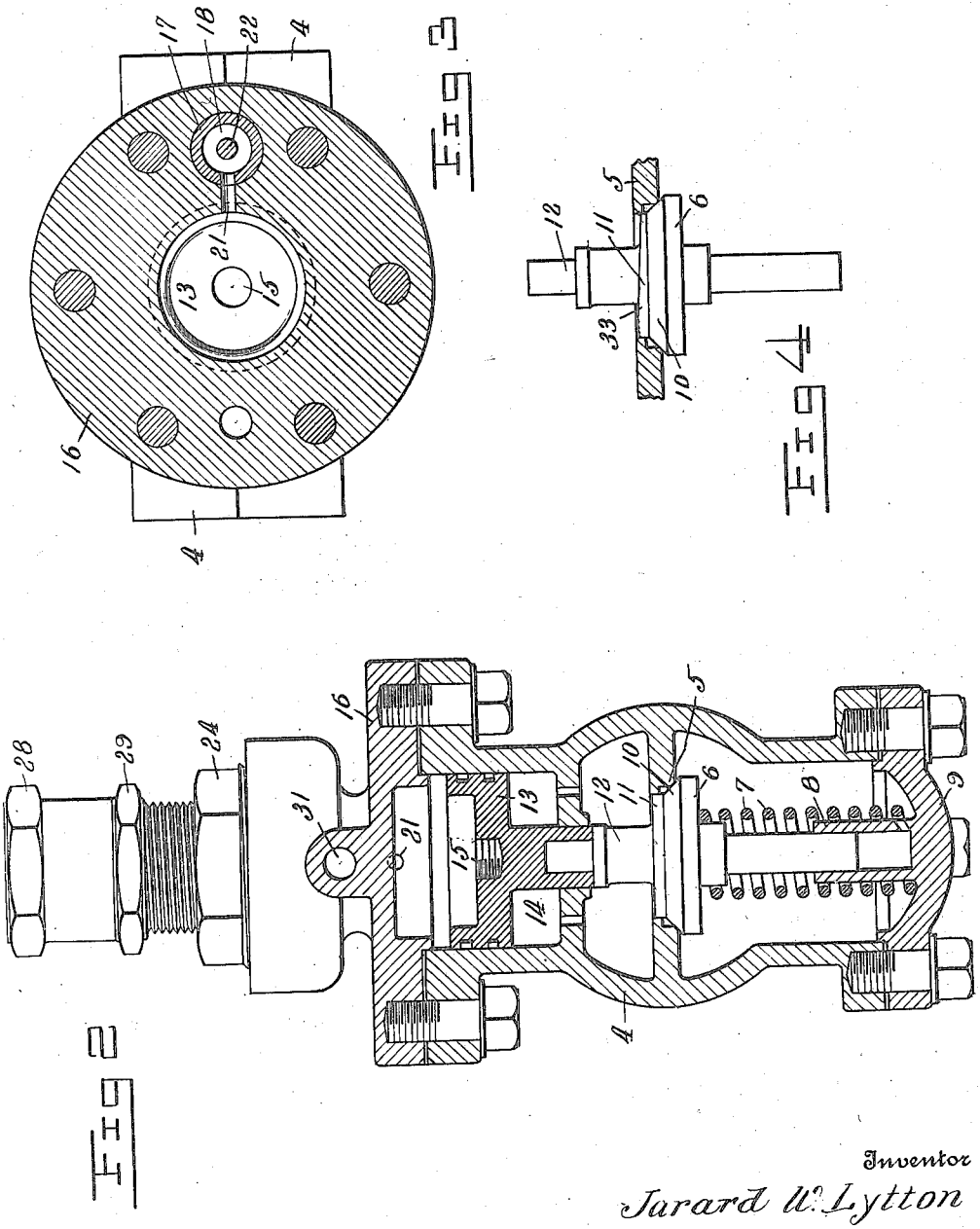

UNITED STATES PATENT OFFICE.

JARARD W. LYTTON, OF FRANKLIN, VIRGINIA, ASSIGNOR TO LYTTON MANUFACTURING CORPORATION, OF FRANKLIN, VIRGINIA, A CORPORATION OF VIRGINIA.

PRESSURE-REGULATOR.

1,184,761.  Specification of Letters Patent.  Patented May 30, 1916.

Application filed February 2, 1911.  Serial No. 606,282.

*To all whom it may concern:*

Be it known that I, JARARD W. LYTTON, a citizen of the United States, residing at Franklin, in the county of Southampton and State of Virginia, have invented new and useful Improvements in Pressure-Regulators, of which the following is a specification.

The present invention relates to pressure regulators, and while in its present embodiment it is shown and designed for steam pressure regulation, it will be obvious that it may be adapted, without departing from the invention, to the regulation of any fluid pressure. It belongs to that type of fluid-pressure regulators known as outlet-pressure control, so called for the reason that the pressure is regulated and determined by the pressure on the outlet-side of the control valve. Broadly considered such regulators are old and well known, various structures having been devised for controlling fluid pressure according to the outlet pressure in the system, and in some of its general features the present regulator resembles, therefore, certain regulators which have heretofore been known.

The invention in the present case, however, consists in so combining and disposing the operative parts as that a regulator structure will be provided in which the number of parts going to make up the regulator is reduced to a minimum, and these parts are so brought together as to give a compact structure when assembled; and one in which the necessity for readjustment, replacement, or repair of parts, should it arise, can be met without taking down the entire regulator structure or disconnecting it from its place in the system where it has been installed.

In order that the invention may be clear to those skilled in the art, I have illustrated in the accompanying drawings one embodiment thereof, although it is to be understood that this disclosure is merely illustrative and not restrictive, so that such variations from the disclosure as are within the range of mechanical skill must be regarded as merely substitutes for and not departures from the invention set forth.

In the drawings—Figure 1 is a section on a vertical line approximately centrally of the regulator structure, to show the interior construction and relation of parts, certain parts being in elevation for clearness. Fig. 2 is a sectional view on approximately the line 2—2, Fig. 1, looking in the direction of the arrow, being at right angles to the section line of Fig. 1. Fig. 3 is a sectional view approximately on the line 3—3 of Fig. 1, the section being laid in different planes to bring out the various features. Fig. 4 is a detail view of a slightly different form of valve from that shown in the other views, to which reference will be hereinafter made.

Referring to the drawings by numbers, like numbers indicating like parts in the several views, 4 indicates the valve casing proper which has an inlet and an outlet; a valve seat 5 with an upwardly seating valve 6 being provided between the inlet and the outlet, said valve 6 being normally held to its seat by a spring 7 which surrounds the tail of the valve, which tail is seated in a cupped tail-socket 8 or equivalent bearing carried, in the present instance, by the cap 9, bolted or otherwise suitably secured to body 4 of the valve, the joint being sealed by a gasket as usual.

The valve 6 is of the reciprocating type, and has a coned seating surface 10 which bears against the valve-seat proper, and above the said coned surface 10 I preferably provide a cylindrical section 11 which fits closely the port in the valve-seat 5, so that, as the coned valve surface 10 leaves the valve seat in the operation of the regulator, the port is not at once opened but the cylindrical section 11 must be withdrawn before the valve is open to permit pressure to pass from the inlet to the outlet side. This construction prevents the valve and its seat from being wire drawn or cut in use, for the reason that the valve 6 must be moved an appreciable distance from the seat before the passage of fluid can take place, and the objectionable wire drawing of the valve surfaces under high pressures which usually takes place where the fluid passes in a thin film immediately the valve leaves its seat is entirely done away with.

The valve 6 is provided with a stem 12, the upper end of which is preferably, as shown, reduced and socketed in the rod of a piston 13 mounted in a suitable piston-chamber 14 directly above the valve chamber and communicating therewith through suitable equalizing ports in the web which separates the valve chamber and the piston chamber. The said piston 13 is of a not unusual type, being provided with any suitable packing, and preferably cupped at its upper surface for lightness. In order that this piston may be readily removed from its chamber I have provided, as one suitable means, a threaded socket 15 which may be engaged by a suitable lifting tool, so that the piston may be withdrawn, it being understood that the connection between the valve stem 12 and the piston rod is simply a sliding connection, so that the two may be readily separated when moved independently away from each other in the line of their normal travel, but will work together in response to pressures either against the valve or against the piston.

The valve casing 4 is capped by a suitable head 16, having means, shown in the present instance as an annular rib 16ª, to engage the upper end of the piston chamber 14. This rib 16ª serves to center the head 16 on the casing 4, and insure the ready and accurate registering of the ports in the casing and head, as well as the bolt holes provided for the securing bolts. Said head 16 is secured to the casing by bolts and sealed by the usual gasket, as shown in Fig. 2, or in any suitable manner, said head 16 carrying a valve-seat 17 off-centered from the center of the regulator casing, said valve-seat 17 being fitted in a suitable socket in the casing and having a control valve 18 which is normally held against its seat by a spring which upholds the valve and is housed in a suitable boring or chamber 19, communicating by passage 20, with the inlet side of the regulator. The said control valve has a passage 21 leading from its upper side to above the piston 13, the head 16 having preferably a chamber 21ª to which the passage 21 delivers, and which communicates directly with the piston chamber 14, all as best shown in Fig. 1, so that upon opening of the valve 18 against its seating spring, pressure from the inlet side will flow to the piston chamber, depress the piston and open the valve 6, thereby permitting pressure to pass through the port or valve-seat 5 to the outlet side. The said valve 18 is provided with a stem 22 which passes with a closely sliding fit to a diaphragm-chamber above the control-valve-chamber, the stem 22 bearing against a diaphragm 23, which I preferably make of metal, which diaphragm is seated in a suitable socket formed in the head 16, and is clamped in place by a housing 24, carrying the regulating spring 25, by means of which the diaphragm pressure is determined. The spring 25 is seated at its lower end against a block 26 which impinges on the diaphragm 23, preferably at its center and in line with the stem 22 of the control-valve, while at its upper end the spring 25 has a block 27 which receives a nipple on the adjusting cap 28, threaded as shown to the housing 24, a lock nut 29 being provided by means of which the adjusting cap 28 may be fixed in its adjusted position. It will be obvious that the tension of spring 25 may be varied as desired, so that the action of the diaphragm 23 against the control valve 18 may be closely and certainly controlled and the opening and closing movements of this valve 18 in response to predetermined pressures effected with accuracy. The said diaphragm 23 is subject to outlet pressure on its under side through passages 30 and 31 formed, respectively, in the valve casing 4 and the head 16, so as to coincide when the parts are brought together and give a direct communication from the outlet side of the valve to the underside of the diaphragm, it being seen that this will bring the opposing stresses of outlet-pressure and the regulable spring 25 on opposite sides of the diaphragm 23. Preferably the head 16 is provided with plugged orifices 32 in alinement with the passages 30 and 31 so that these passages may be readily cleaned of any clogging deposits without the necessity of taking down the regulator parts.

With this construction it will be seen that when pressure on the outlet-side of the regulator falls, the spring 25 acting against the diaphragm 23 will open the valve 18, permitting inlet pressure to pass by passage 20, chamber 19, and passage 21 to the top of the piston 13, which, in its downward movement will move the valve 6 from its seat against the spring 7, opening the port or valve-seat 5 and permitting pressure to pass to the outlet side. Obviously, the pressure on the outlet-side will at once pass to the diaphragm 23 by passages 30 and 31, and immediately the pressure on the outlet-side reaches the point where it exerts sufficient force on the diaphragm 23 to return the spring 25, the control valve 18 will close, cutting off inlet pressure from the piston 13, whereupon the pressure beneath the valve 6, coupled with the spring 7, will throw the valve 6 at once to its seat and cut off flow through the port 5, this operation continuing or being repeated as the outlet pressure falls to the point where it must be fed up. It will be clear that the regulating cap 28 provides means whereby the pressure at which the valve 18 will function may be nicely adjusted and controlled.

The construction is one in which the regulator parts are few in number and when assembled are brought within a small compass; the main casing containing or supporting all of the operative parts assembled within a very small area. The feed valve of the regulator and its piston are both alined and mounted in one section of the regulator, and they are readily separable so that in the one case, by taking off the head of the regulator casing the piston may be removed without disturbing the valve, and on the other hand by removing the bottom plate of the valve casing, the valve may be taken out without removing the piston. Similarly the control valve is accessible on taking off the head of the regulator casing, and said control valve, as well as its seat, may be readily repaired, replaced, or readjusted without disturbing the other parts; and this control valve is mounted within the circumferential area of the regulator casing, being balanced on the opposite side by the diaphragm passage which leads from the outlet side of the regulator to the underside of the diaphragm. The diaphragm and its regulating spring are conveniently arranged with respect to the control valve without increasing the area of the structure as they surmount the casing and are seated directly in the head of the casing in alinement with the control valve with which they coöperate. Furthermore, the diaphragm and the regulating spring are accessible and removable for inspection or repair without the necessity of taking down the casing proper. All of this makes for simplicity in structure which gives a regulator of reasonable cost, both as to production and maintenance, and yet one in which a very effective functioning is secured, and that without complication of operative parts.

In Fig. 4 I have shown a slightly different form of valve in which I incline the upper surface of the cylindrical portion of the valve, as at 33, so that the cylindrical portion is lower on one side than on the other, which, as will be readily seen, gives a gradual opening of the port, and this will not only further safeguard against wire drawing, but gives a closer regulation, and is desirable where the pressure is low and the consumption is small.

I claim:—

1. In combination, a pressure regulator comprising a casing having an inlet and an outlet and a pair of vertically disposed passages extending one from the inlet and one from the outlet, the vertically disposed inlet passage having a counterbore, the casing also having an intermediate piston chamber and a valve seat beneath the chamber and between said inlet and said outlet, a piston in said chamber, a valve normally urged against said valve seat and having operative connection with said piston, a head fitted over said casing and having a pair of vertically disposed passages registering with the vertically disposed passages of the casing, the vertical passage of the head in registry with the vertical inlet passage of the casing being enlarged to a slightly greater diameter than that of said counterbore, the head having a transverse passage communicating the upper ends of the vertical passages of the head, said head having a passage communicating the upper end of the piston chamber and said enlarged passage, and a pilot valve carried in said enlarged passage of the head and operable in said counterbore of the vertical inlet passage.

2. In combination, a pressure regulator comprising a casing having an inlet and an outlet and a pair of vertically disposed passages extending one from the inlet and one from the outlet, the vertically disposed inlet passage having a counterbore, the casing also having an intermediate piston chamber and a valve seat beneath the chamber and between said inlet and said outlet, a piston in said chamber, a valve normally urged against said valve seat and having operative connection with said piston, a head fitted over said casing and having a pair of vertically disposed passages registering with the vertically disposed passages of the casing, the vertical passage of the head in registry with the vertical inlet passage of the casing being enlarged to a slightly greater diameter than that of said counterbore, the head having a transverse passage communicating the upper ends of the vertical passages of the head, a valve seat held in said enlarged passage and closing the upper end thereof, and a pilot valve for the seat and operable in said counterbore of the vertical inlet passage of the casing, said head having a passage communicating the upper end of the piston chamber and said valve seat.

In testimony whereof I have hereunto set my hand in presence of two subscribing witnesses.

JARARD W. LYTTON.

Witnesses:
 THO. E. TURNEY,
 E. EUNICE WHITEHORN.